US011981186B2

(12) United States Patent
Tarchala et al.

(10) Patent No.: US 11,981,186 B2
(45) Date of Patent: May 14, 2024

(54) METHOD AND SYSTEM FOR RESPONSIVE CLIMATE CONTROL INTERFACE

(71) Applicant: Honda Motor Co., Ltd., Tokyo (JP)

(72) Inventors: Christopher Tarchala, Torrance, CA (US); Hanna Gee, Torrance, CA (US); Megan Colleen Sundquist, Grand Rapids, MI (US)

(73) Assignee: Honda Motor Co., Ltd., Tokyo (JP)

(*) Notice: Subject to any disclaimer, the term of this patent is extended or adjusted under 35 U.S.C. 154(b) by 461 days.

(21) Appl. No.: 17/217,365

(22) Filed: Mar. 30, 2021

(65) Prior Publication Data

US 2022/0314749 A1    Oct. 6, 2022

(51) Int. Cl.
*G06F 3/04847* (2022.01)
*B60H 1/00* (2006.01)
*B60H 3/00* (2006.01)
*G06F 3/0488* (2022.01)
*B60H 1/24* (2006.01)

(52) U.S. Cl.
CPC ............ *B60H 3/00* (2013.01); *B60H 1/00295* (2019.05); *G06F 3/04847* (2013.01); *G06F 3/0488* (2013.01); *B60H 1/00064* (2013.01); *B60H 2001/00185* (2013.01); *B60H 1/00207* (2013.01); *B60H 1/00642* (2013.01); *B60H 1/00771* (2013.01); *B60H 1/00792* (2013.01); *B60H 1/00985* (2013.01); *B60H 1/24* (2013.01); *B60Y 2400/902* (2013.01)

(58) Field of Classification Search
CPC .. B60H 3/00; B60H 1/00295; B60H 1/00064; B60H 1/00207; B60H 1/00642; B60H 1/00771; B60H 1/00792; B60H 1/00985; B60H 1/24; B60H 1/00657; B60H 2001/00185; B60Y 2400/902; Y02B 30/70; G06F 3/0488; G06F 3/04847; B60K 2370/143–1446; B60K 2370/146–1476; B60K 2370/162; B60K 2370/56–577
See application file for complete search history.

(56) References Cited

U.S. PATENT DOCUMENTS

| 8,332,075 | B2 | 12/2012 | Harrod et al. |
| 9,001,035 | B2 | 4/2015 | Chow |
| 9,079,498 | B2 | 7/2015 | Small et al. |
| 9,545,930 | B2 | 1/2017 | Ricci |

(Continued)

FOREIGN PATENT DOCUMENTS

| DE | 102016214999 A1 * | 2/2018 | |
| KR | 1020180127042 A | 11/2018 | |
| WO | WO-2013005093 A1 * | 1/2013 | ........... B60H 1/0065 |

*Primary Examiner* — Tuyetlien T Tran

(74) *Attorney, Agent, or Firm* — Plumsea Law Group, LLC

(57) ABSTRACT

A method and system for a responsive climate control interface are disclosed. The climate control interface includes an interactive element further comprised of a climate settings map and a climate setting selector. The climate setting selector can be moved to different locations on the climate settings map in order to select a climate setting with a particular temperature and fan speed. The appearance of both the climate settings map and the climate setting selector can be changed as the climate change selector is moved in order to visually indicate temperature and fan speed settings. The system also includes a haptic feedback module that can convert climate settings into haptic feedback levels.

20 Claims, 10 Drawing Sheets

(56) References Cited

U.S. PATENT DOCUMENTS

| | | | |
|---|---|---|---|
| 9,829,979 B2 | 11/2017 | Brombach et al. | |
| 10,065,502 B2 | 9/2018 | Miller et al. | |
| 10,780,909 B2 | 9/2020 | Aerts et al. | |
| 2003/0070437 A1* | 4/2003 | Hafner | B60H 1/00985 236/94 |
| 2009/0216383 A1* | 8/2009 | Klinger | B60H 1/00985 700/278 |
| 2013/0057500 A1 | 3/2013 | Kulczycki | |
| 2015/0143249 A1* | 5/2015 | Sasaki | F24F 11/30 715/740 |
| 2016/0120009 A1 | 4/2016 | Aliakseyeu et al. | |
| 2017/0060358 A1 | 3/2017 | Hirano et al. | |
| 2017/0220114 A1* | 8/2017 | Iino | G06F 3/04883 |
| 2018/0314403 A1 | 11/2018 | Kukita et al. | |
| 2019/0212910 A1 | 7/2019 | Abt et al. | |
| 2020/0062076 A1 | 2/2020 | Elson et al. | |
| 2021/0070145 A1* | 3/2021 | Nitze-Nelson | B60H 1/00985 |

* cited by examiner

METHOD AND SYSTEM FOR RESPONSIVE CLIMATE CONTROL INTERFACE

BACKGROUND

The embodiments relate generally to methods and systems for a responsive climate control interface.

Motor vehicles may have climate control systems that control temperature, fan speed, as well as other properties of a vehicle's interior climate. The climate control systems may intelligently modify the operation of the heating, ventilation, and cooling (HVAC) system of the vehicle.

Currently, climate control systems in vehicles provide separate controls for users to adjust the temperature and fan speed. For example, a vehicle may have a control knob for increasing and decreasing the temperature, and a separate set of buttons for increasing and decreasing fan speed. In vehicles where a digital interface for climate controls may be used, the interface may simply recreate digital versions of control knobs, buttons, levers, or other standard input components.

The separation of controls means that users must take time to adjust each control separately. Moreover, current control systems may provide discrete indicators of current temperature and/or fan speed settings that fail to capture the potential variability of the climate control settings.

There is a need in the art for a system and method that addresses the shortcomings discussed above.

SUMMARY

Embodiments provide methods and systems for a responsive climate control interface.

In one aspect, a method of modifying an appearance of graphical elements of a climate control application in response to user behavior includes a step of displaying a first graphical element comprising a climate settings map, where different locations on the climate settings map correspond to different pairs of temperature and fan speed settings for a climate control system. The method also includes a step of displaying a second graphical element comprising a climate setting selector, where moving the climate setting selector to different locations of the climate settings map corresponds to adjusting the temperature and fan speed settings of the climate control system. The method further includes a step of receiving, via the climate control application, user input corresponding to moving the climate setting selector from a first location of the climate settings map to a second location of the climate settings map. The method also includes steps of automatically altering, in response to receiving the user input, the appearance of the climate settings map and automatically altering, in response to the user input, the appearance of the climate setting selector.

In another aspect, a method of modifying visual and haptic feedback at a display in response to user input received at a climate control application includes a step of displaying a first graphical element comprising a climate settings map, where different locations on the climate settings map correspond to different pairs of temperature and fan speed settings for a climate control system. The method also includes a step of displaying a second graphical element comprising a climate setting selector, where moving the climate setting selector to different locations of the climate settings map corresponds to adjusting the temperature and fan speed settings of the climate control system. The method also includes a step of receiving, via the climate control application, user input corresponding to moving the climate setting selector from a first location of the climate settings map to a second location of the climate settings map. The method also includes steps of automatically altering, in response to receiving the user input, the appearance of the climate settings map, and automatically altering, in response to the user input, an amount of haptic feedback provided at the computing device.

In another aspect, a system for adjusting an appearance of graphical elements of a climate control application in response to user behavior includes a processor and machine-readable media including instructions. The instructions, when executed by the processor, cause the processor to display a first graphical element comprising a climate settings map, where different locations on the climate settings map correspond to a different pair of temperature and fan speed settings for a climate control system. The instructions also cause the processor to display a second graphical element comprising a climate setting selector, where moving the climate setting selector to different locations of the climate settings map corresponds to adjusting the temperature and fan speed settings of the climate control system. The instructions also cause the processor to receive, via the climate control application, user input corresponding to moving the climate setting selector from a first location of the climate settings map to a second location of the climate settings map. The instructions also cause the processor to automatically alter, in response to receiving the user input, the appearance of the climate settings map, and to automatically alter, in response to the user input, the appearance of the climate setting selector.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
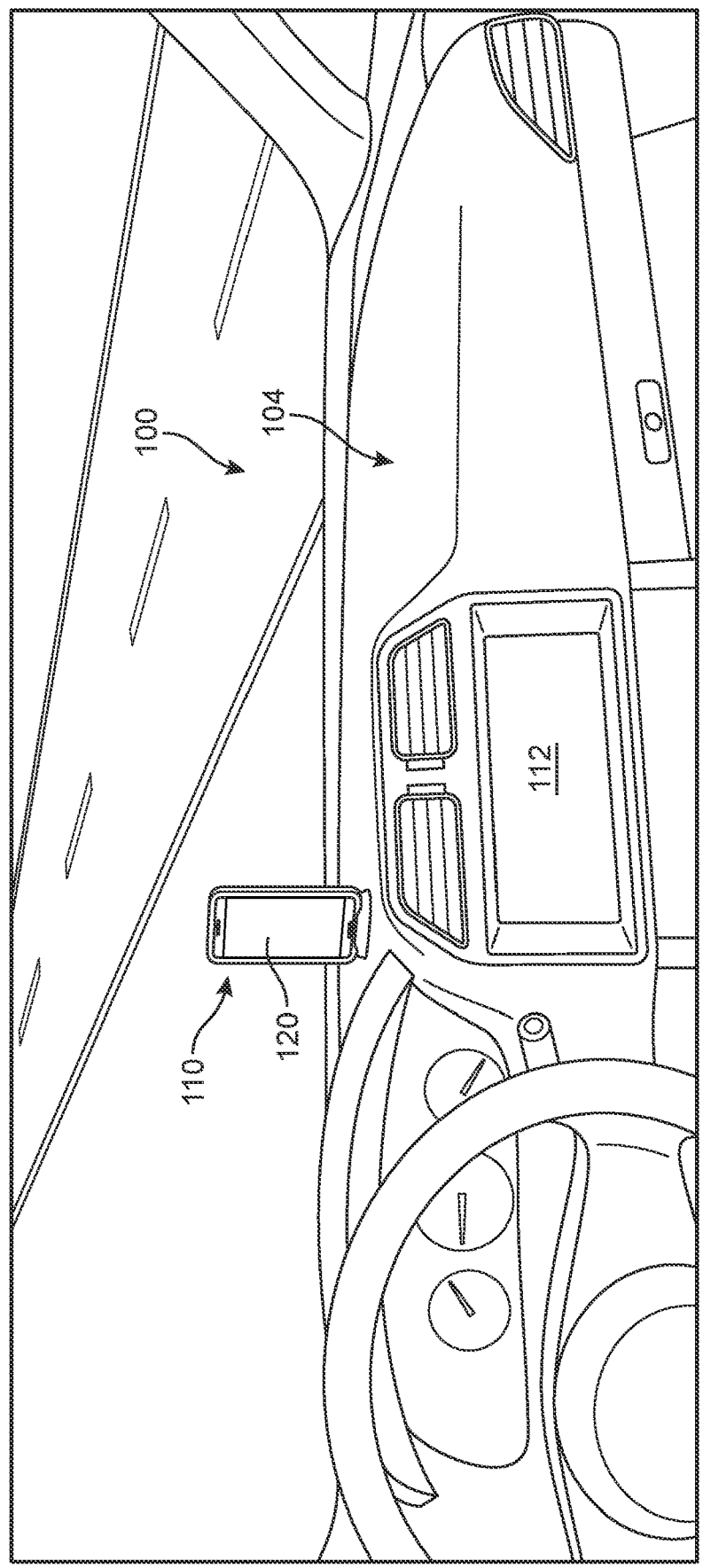
FIG. 1 is a schematic view of an interior of a vehicle, including multiple computing devices that may be used to adjust settings of a climate control system, according to an embodiment.

Embodiments provide methods and systems for a responsive climate control interface. The climate control interface may be used with any suitable climate control system. In some embodiments, the climate control interface could be used with a climate control system operating in a motor vehicle. As used herein, "motor vehicle" may refer to any motorized cars, trucks, motorcycles, scooters, boats, planes or other suitable motorized vehicles. As another example, the climate control interface could be used with a climate control system operating in a home or other building.

As used herein, the term "climate control system," may be used to refer to a computerized system that can automatically adjust heating, ventilation, and air conditioning (HVAC) systems in a motor vehicle. In some cases, the term climate control system can refer to both the computerized system and the HVAC components themselves.

Throughout this disclosure, references to components or modules generally refer to items that logically can be grouped together to perform a function or group of related functions. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" or "triggering event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

Furthermore, graphical user interfaces (GUIs) can be used to present information to a user in the form of icons, graphics, or other types of interactive elements. Such interactive elements are generally associated with a particular action or command. A user typically has to supply an input to a computing system that is associated with the interactive elements presented on the graphical user interface to execute the particular action or command. As used herein, "interactive element" broadly includes a wide variety of graphical tools or components, such as graphical icons, graphical images, graphical menus, graphical buttons, hyperlinks, images, and any other element which can be displayed on a graphical display and associated with or otherwise linked to an action or process that is to be performed upon activation of an interactive element.

Graphical elements may be understood as existing in different layers within a user interface view. As used herein, a first graphical element is disposed "in front of" a second graphical element if the first graphical element appears to be superimposed on the second graphical element such that the first graphical element obscures part of the second graphical element (unless the element is transparent or hidden). Likewise, a first graphical element is disposed "behind" a second graphical element if the second graphical element appears to be superimposed over the first graphical element.

For purposes of introduction, an overview of one embodiment of the proposed systems and methods is illustrated with reference to FIGS. 1-2. In FIG. 1, a partial view of the interior of a motor vehicle 100 is shown schematically. Within the interior, a first computing device ("first device") 110 in the form of a smartphone is shown. In other embodiments, first device 110 could be a tablet, laptop, desktop, or another type of computing device. The first device 110 includes a display 120 (in this case, a touchscreen display) that provides a viewing and interactive mechanism for the user. In this embodiment, first device 110 is mounted to a dashboard 104 of the motor vehicle interior so that first device 110 can be easily accessed by a driver and/or passenger of the vehicle.

As seen in FIG. 1, in some embodiments, a vehicle may also be equipped with a second computing device ("second device") 112 in the form of an in-dash computing device. Unlike first device 110, which may be a mobile device, second device 112 may be integrated into dashboard 104. Second device 112 may also include a display (in this case, a touchscreen display) that provides a viewing and interactive mechanism for the user.

Either of first device 110 or second device 112 can be configured to run an application that may communicate with one or more vehicle control systems within motor vehicle 100 so that a user can control one or more aspects of the system using the computing device. Exemplary vehicle control systems that could be controlled in this manner include, but are not limited to, audio systems; heating, ventilation and air conditioning (HVAC) systems; climate control systems; navigation systems; and/or other systems.

Figure 2:
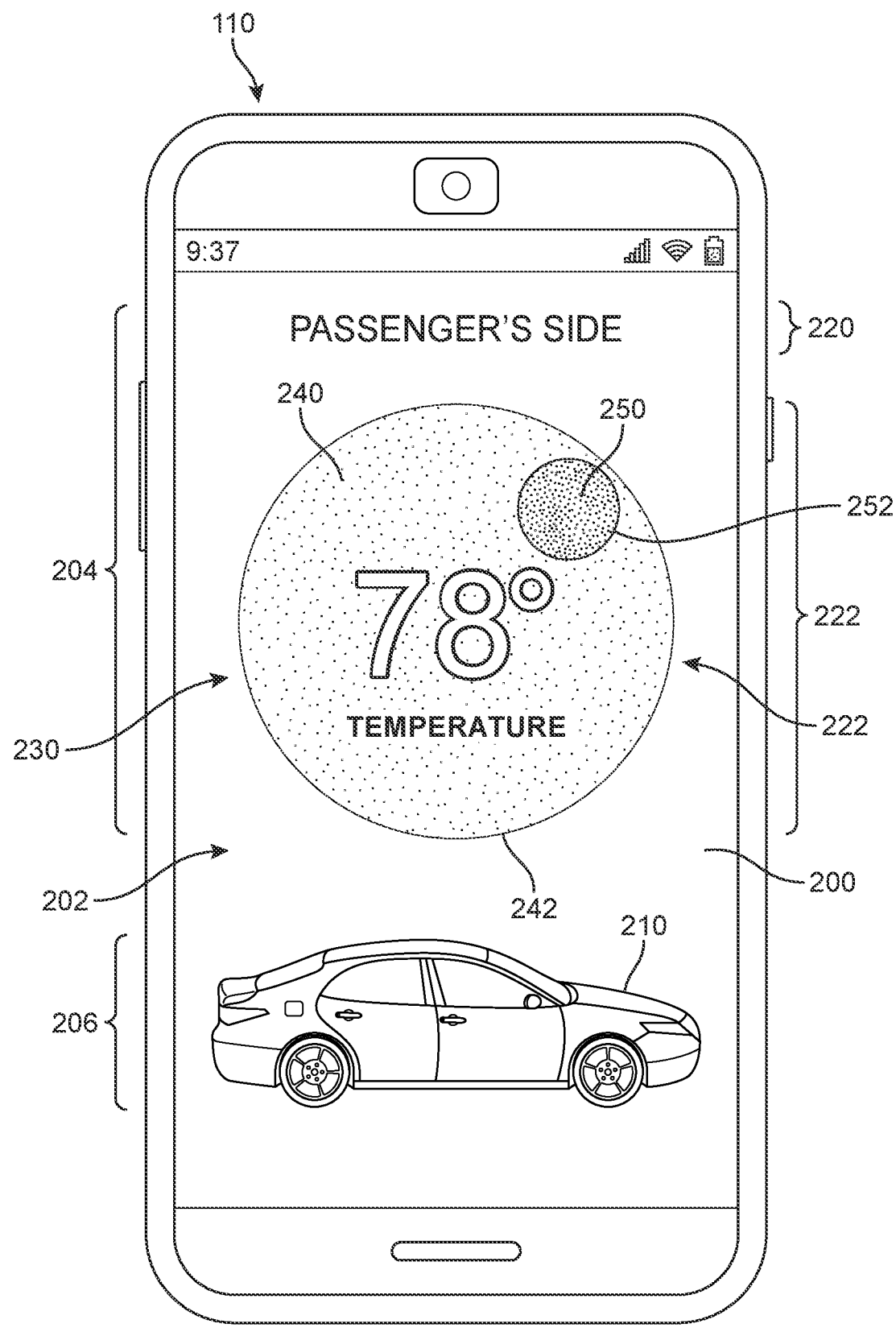
FIG. 2 is a schematic view of a mobile phone running a climate control application, according to an embodiment.

In FIG. 2, first device 110 is shown running a climate control application ("app") 200 configured to provide an interface for climate controls. Specifically, in this embodiment, app 200 provides a user interface ("UI") 202 for controlling both the temperature and the fan speed of the vehicle's climate control system. UI 202 may further include a climate control display area 204, and a selected vehicle display area 206.

Selected vehicle display area 206 may include graphical elements indicating which vehicle is being controlled by the interface. In some cases, a user could own multiple different vehicles that may all be controlled by app 200. In such cases, a user may first select the particular vehicle they want to control. Alternatively, in some cases, app 200 may be configured to automatically detect a vehicle. Once a vehicle is manually selected or otherwise detected, a graphical element 210 can be shown in selected vehicle display area 206. In the exemplary embodiment, graphical element 210 is an image of the particular make and model of a vehicle owned by the user.

Climate control display area 204 may include a selected region display area 220 and a settings display area 222. Selected region display area 220 may display text indicating a particular climate control region that is being adjusted. For example, in FIG. 2, selected region display area 220 displays the text "Passenger's Side", indicating that the displayed settings are for controlling the climate on the passenger side of the vehicle. App 200 may include additional controls (not shown) for adjusting the selected region. For example, in some embodiments, a user could swipe left or right within selected region display area 220 to change the selected climate control region to "Driver Side," "Rear Passenger," or other suitable climate control regions in the vehicle.

Settings display area 222 includes graphical elements that provide information about the climate control settings of the vehicle within a particular climate control region. Settings display area 222 also includes interactive elements that allow a user to adjust the climate control settings. As shown in FIG. 2, settings display area 222 includes an interactive element 230.

Interactive element 230 is further comprised of a climate settings map ("settings map") 240 and a climate setting selector ("selector") 250. Both settings map 240 and selector 250 may be graphical elements that are displayed within settings display area 222.

Different locations in settings map 240 correspond to different combinations of climate control settings, as described in further detail below. Selector 250 may be displayed in front of settings map 240. That is, when considering the graphical elements as existing in different layers of a UI layout, selector 250 may be superimposed onto settings map 240, so that selector 250 is always visible.

Selector 250 may be moved or dragged to different locations of settings map, thereby allowing a user to adjust the climate settings. In some embodiments, the possible locations of selector 250 may be constrained so that an outer boundary 252 of selector 250 is always disposed inside of an outer boundary 242 of settings map 240. That is, selector 250 may always be contained within settings map 240.

In an exemplary embodiment, settings map 240 has a circular shape. Selector 250 may also have a circular shape. The diameter of selector 250 may be substantially smaller than the diameter of settings map 240, so that selector 250 can be displayed over settings map 240, with a majority of settings map 240 still visible. Using a circular geometry for both settings map 240 and selector 250 ensures selector 250 can be adjusted to any location of settings map 240 without the interference of corners.

Figure 3:
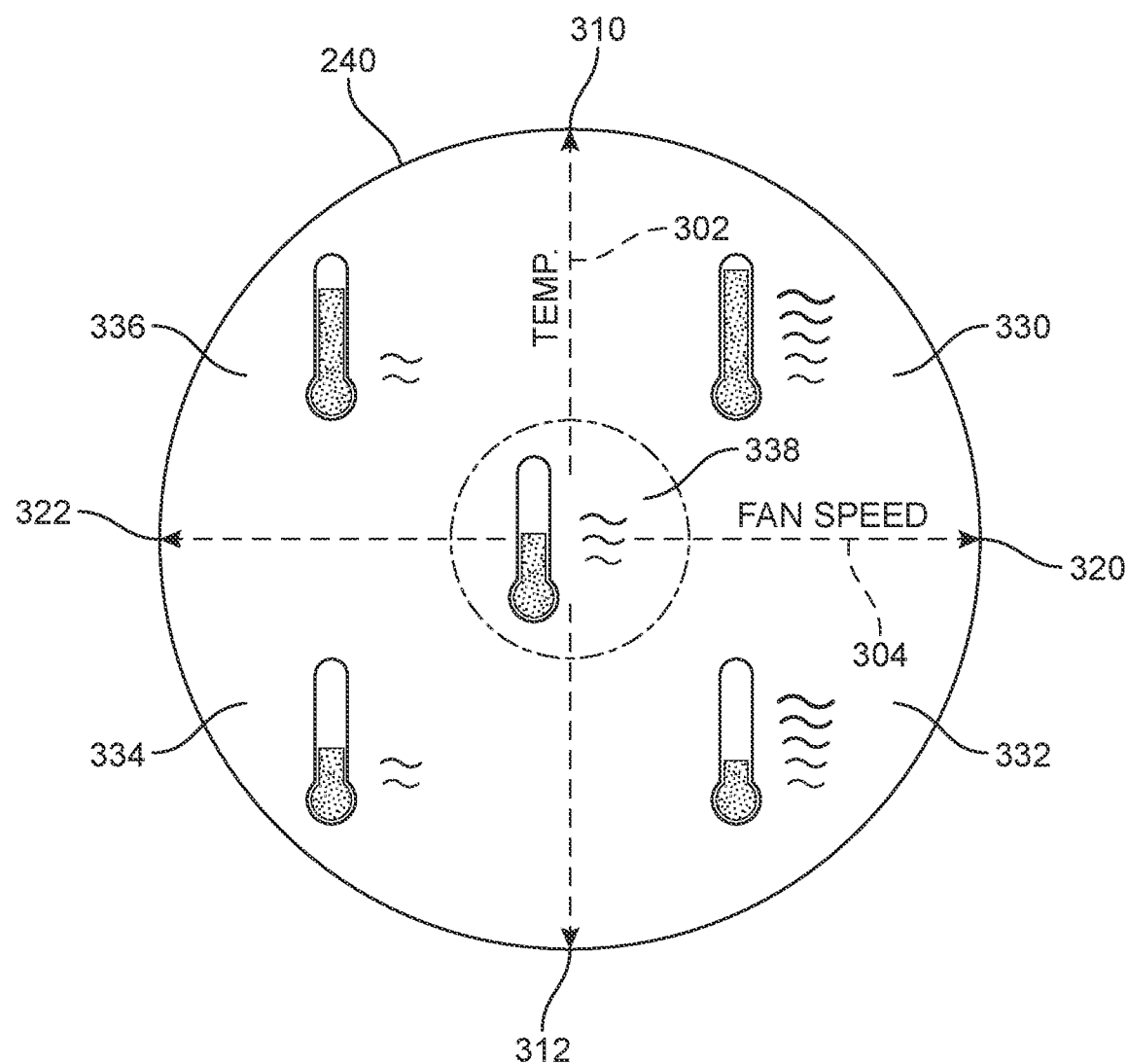
FIG. 3 is a schematic view of a climate settings map, according to an embodiment.

In order to understand the relationship between settings map 240 and different climate control settings for a vehicle, FIG. 3 shows a schematic view of settings map 240 in isolation. Settings map 240 provides a two-dimensional range of possible climate control settings for a vehicle. In particular, in this embodiment, each location on settings map 240 represents a particular value for both temperature and fan speed. That is, each location maps to a unique pair of values corresponding to a particular temperature setting and a particular fan speed setting. It may be appreciated that two different locations could have either the same temperature setting or the same fan speed setting, but not both the same temperature and fan speed settings.

For purposes of understanding how the temperature and fan speed settings change for different locations of settings map 240, a temperature axis 302 and a fan speed axis 304 have been displayed on settings map 240. It may be appreciated that these axes are shown for purposes of clarity and would not be visible to users of the exemplary system.

Temperature axis 302 runs in a first direction, while fan speed axis 304 runs in an approximately perpendicular direction to temperature axis 302. In the exemplary embodiment, temperature axis 302 is oriented in a vertical direction along settings map 240, while fan speed axis 204 is oriented in a horizontal direction. Moreover, the value of the temperature increases towards a first end 310 of temperature axis 302 and decreases towards a second end 312 of temperature axis 302. In embodiments where the temperature axis is oriented vertically, first end 310 may be referred to as the "upper end" and second end 312 may be referred to as the "lower end". By contrast, the value of the fan speed increases towards a first end 320 of fan speed axis 304 and decreases towards a second end 322 of fan speed axis 304. In embodiments where fan speed axis 204 is oriented horizontally, first end 320 may referred to as the "right end" and second end 322 may be referred to as the "left end." Using this configuration, moving a selector in an upward direction along temperature axis 302 corresponds to increasing the temperature. Also, moving a selector in a rightward direction corresponds to increasing the fan speed.

While the exemplary embodiment of FIG. 3 depicts a configuration where temperature increases in a vertical direction and fan speed increases in a horizontal direction, in other embodiments the temperature and fan speed axes could be rotated so they are oriented in any other directions. In some cases, for example, fan speed could be associated with a vertical axis of settings map 240, while temperature may be associated with a horizontal axis of settings map 240. In other cases, these axes could be oriented diagonally.

For clarity, FIG. 3 shows relative temperature and fan speed settings inside of five different climate "zones." These zones are broadly defined by temperature axis 302 and fan speed axis 304. These include an upper-right zone 330, a lower-right zone 332, a lower-left zone 334, an upper-left zone 336, and a central zone 338. In FIG. 3, a single representative temperature and fan speed are shown schematically for each zone in order to illustrate the general correlation between temperature and fan speed across different portions of settings map 240. However, it should be appreciated that the temperature and fan speed settings may be variable within each of these different zones, as shown, for example, in the embodiment of FIGS. 4A-C.

For purposes of illustration, a representative temperature in each region is indicated by a thermometer and a representative fan speed is indicated using wavy lines. A larger number of wavy lines indicates a higher fan speed. Although the fan speed is represented using a discrete number of wavy lines, it may be understood that the fan speed could take on any number of distinct values, including a range of substantially continuous values.

As shown in FIG. 3, in upper-right zone 330, both temperature and fan speed are relatively high. In lower-right zone 332, temperature is relatively low while fan speed is relatively high. In lower-left zone 334, both temperature and fan speed are relatively low. In upper-left zone 336, temperature is relatively high while fan speed is relatively low. In central zone 338, both temperature and fan speed have intermediate values.

In one embodiment, the range of possible temperature settings can vary between a lower temperature and a highest temperature. The lowest temperature may be selected when a selector is at or near lower end 312 of temperature axis 302. The highest temperature may be selected when the selector is at or near upper end 310 of temperature axis 304. In one embodiment, the lowest temperature can be approximately 59 degrees and the highest temperature can be approximately 83 degrees. Also, the fan speed can vary between a lowest speed and a highest speed. The lowest speed may be selected when the selector is at or near the left end 322 of fan speed axis 304. The highest speed may be selected when selector 250 is at or near right end 320 of fan speed axis 304.

As already discussed, temperature and fan speed settings may be variable within the climate zones described in FIG. 3. In some cases, even small adjustments in the location of a selector on a settings map can result in changes in the temperature and/or fan speed settings.

Figure 4C:
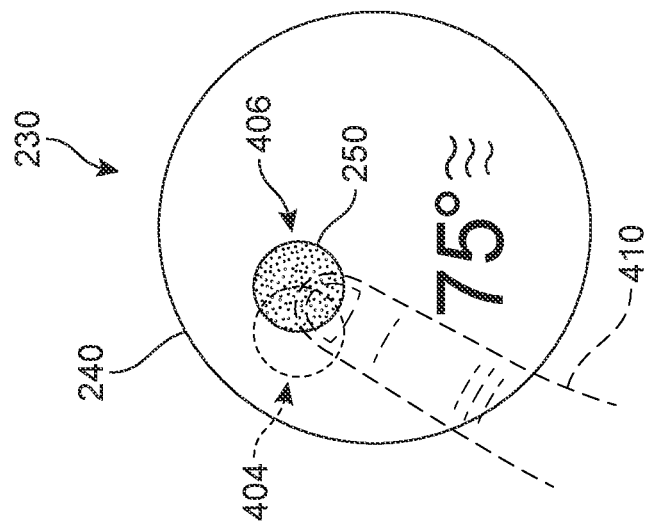
FIGS. 4A-C are schematic views of different climate control settings, according to an embodiment.
Figure 4B:
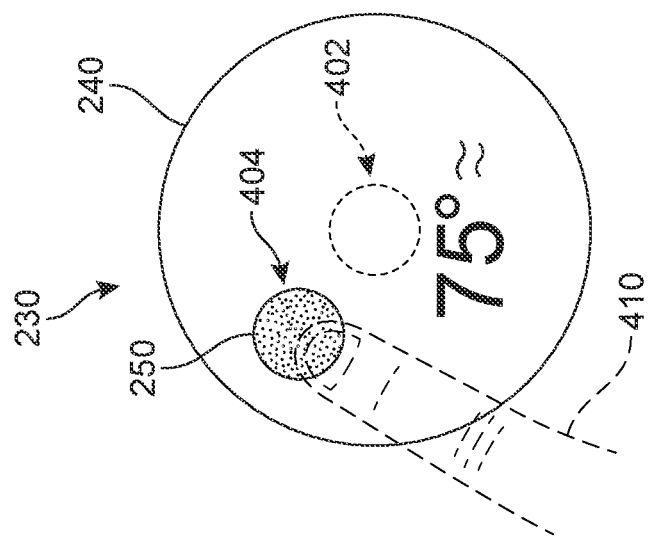
Figure 4A:
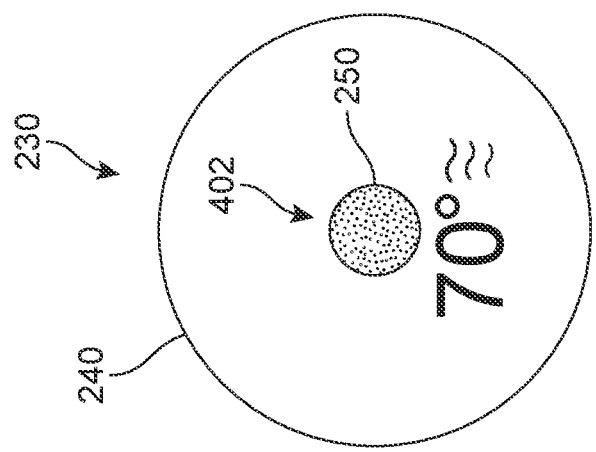

FIGS. 4A-C are schematic views of interactive element 230 in isolation. Specifically, FIGS. 4A-C show selector 250 being moved to different locations of settings map 240 by a user. Initially, as in FIG. 4A, selector 250 may be positioned at a first location 402. First location 402 is a central location in settings map 240. Being centrally located with respect to both temperature axis 302 and fan speed axis 304 (see FIG. 3), placing selector 250 at first location 402 corresponds to selecting an intermediate temperature setting and an intermediate fan speed setting. As an example, the selected temperature is 70 degrees. For reference, a fan speed icon including three wavy lines is used to indicate an intermediate or moderate fan speed. It may be appreciated that values or indicators of the temperature and fan speed may or may not be displayed for a user on settings map 240. In some exemplary embodiments, only the current temperature setting may be displayed since users may want to know the exact value of the temperature settings. Fan speed, by contrast, may not be displayed.

Next, as seen in FIG. 4B, selector 250 may be moved from first location 402 to a second location 404. Specifically, selector 250 may be moved by a user, whose finger 410 is shown in phantom in FIG. 4B. In some embodiments, a user may move the location of selector 250 by touching selector 250 and dragging it to another location. In other embodiments, however, a user could simply tap on a second location of settings map 240 without first touching selector 250. In other embodiments, any other suitable touch-based gestures could be used to change the position of selector 250. As seen by comparing FIG. 4B with FIG. 3, second location 404 may be disposed in upper left zone 336 of settings map 240. This indicates that the temperature has increased relative to the temperature at first location 402, while the fan speed has decreased relative to the fan speed at first location 402.

In FIG. 4C, the user may drag selector 250 from second location 404 to a third location 406. Here, the temperature setting remains unchanged, since third location 406 has a substantially similar vertical position along temperature axis 302 (see FIG. 3) to second location 404. However, third location 406 is located slightly rightward of second location 404, with respect to fan speed axis 304 (see FIG. 3), and so the fan speed may be increased slightly compared to that of third location 406.

In some embodiments, the gradation of the temperature could vary. In one embodiment, for example, the temperature setting may be adjusted in one-degree increments as a user drags selector 250 between two locations. In another embodiment, the temperature setting can be adjusted in tenth of a degree increments as a user drags selector 250 between two locations.

In some embodiments, the gradation of the fan speed could vary. In one embodiment, for example, the fan speed could be incremented over three different fan speed settings. In another embodiment, fan speed could be incremented over five or more different fan speed settings. More generally, the fan speed could be incremented over any suitable number of different fan speed settings. In embodiments where the fan speed is controlled by a variable resistor, the fan speed could be varied in a substantially continuous manner.

It may be appreciated that with suitably small increments of temperature and fan speed, interactive element 230 may provide a user with a large, and nearly continuous, range of possible climate settings.

Interactive element 230 may be responsive to changes in climate settings. In some cases, interactive element 230 may give users immediate feedback and allow them to quickly determine when they've reached their desired climate setting. In some embodiments, the appearance of one or more elements of an interface can be modified in response to changes in the climate settings. In some embodiments, other kinds of feedback, including haptic feedback, can be modified in response to changes in climate settings.

Interactive element 230 (including both settings map 240 and selector 250) may be configured with dynamic attributes that change according to user settings, current climate conditions in the vehicle, or other suitable inputs. In some embodiments, the color attributes of interactive element 230 could be dynamically adjusted. Examples of color attributes include hue, saturation, and brightness. As used herein, "hue" refers to the degree to which a given color is similar to one of a standard set of colors. For example, a hue may refer to a particular color selected from a color wheel that shows a set of colors between red and purple. The term "saturation," as used herein, refers to the amount of white mixed with a hue. As the saturation of different hues are decreased ("desaturation"), the dominance of any given hue in a color is diminished. The term "brightness," as used herein, refers to the lightness/darkness of the color. As the lightness of a color is diminished, the color may appear closer and closer to being black.

In some embodiments, one or more color attributes of settings map 240 could be adjusted in response to changes in the temperature setting. For example, in one embodiment, as a user adjusts the temperature by changing the position of selector 250, the hue of settings map 240 may change. Specifically, in some cases, the hue may change from a cooler color, such as blue, to a warmer color, such as red.

In some embodiments, rather than use a single hue for the entirety of settings map 240, a color gradient could be used for settings map 240. That is, settings map 240 may be colored using multiple colors that are arranged in a gradient pattern. The color gradient may include a range of colors running from a first hue associated with a coldest temperature setting to a second hue associated with a hottest temperature setting. As the temperature setting is increased, the gradient pattern of settings map 240 may shift so that the second ("hottest") hue dominates. As the temperature setting is decreased, the gradient pattern of climate setting 240 may shift so that the first ("coldest") hue dominates. Thus, the system provides a way of visually displaying changes in the temperature setting in a way that a user can quickly perceive as they move selector 250 through a range of possible climate control settings.

In some embodiments, one or more color attributes of selector 250 could be adjusted in response to changes in the fan speed setting. For example, in one embodiment, as a user adjusts the fan speed by changing the position of selector 250, the saturation of selector 250 may change. Specifically, maximum saturation may be achieved when the fan speed is at its highest setting. And the lowest saturation may be achieved when the fan speed is at its lowest setting. Thus, the system provides a way of visually displaying changes in the fan speed setting in a way that a user can quickly perceive as they move selector 250 through a range of possible climate control settings.

Although the saturation of selector 250 may vary with the fan speed setting, the hue of selector 250 may be set to match the portion of settings map 240 where selector 250 is located. That is, if selector 250 is located at portion of settings map 240 with a red hue, then selector 250 may have a matching red hue. Likewise, if selector 250 is located at portion of settings map 240 with a blue hue, then selector 250 may have a matching blue hue. However, even as the hue of selector 250 may match the hue of the background, the saturation of selector 250 may vary with fan speed, so that the appearance of selector 250 may be substantially different from the appearance of the underlying portion of settings map 240.

To better illustrate the responsive changes to the color attributes of both settings map 240 and selector 250 as a user drags selector 250 to different locations on settings map 240, FIGS. 5A-5D show schematic views of interactive graphic element 230 for multiple climate settings.

For purposes of illustration, in FIGS. 5A-5D, hues of a graphical element are represented using stippling (shading). Low saturation is indicated by a phantom (dotted) outer boundary for a graphical element, while high saturation is indicated using a thicker (solid) the boundary for a graphical element.

Figure 5A:
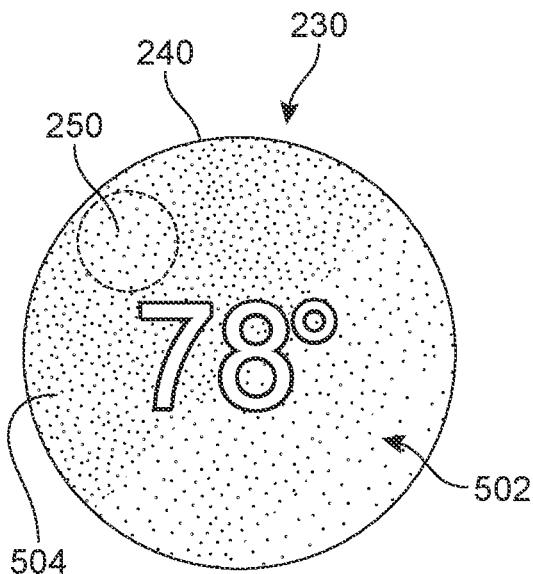
FIGS. 5A-D are schematic views of different climate control settings, according to an embodiment.

In FIG. 5A, the location of selector 250 corresponds to a relatively high temperature (78 degrees in this example) and a relatively low fan speed. These relative settings are reflected in the color attributes of both settings map 240 and selector 250. Specifically, settings map 240 is colored with a gradient pattern 502 that is dominated by a first hue 504 which is associated with a higher temperature. In one embodiment, first hue 504 could be a warmer color, such as red or orange. Gradient pattern 502 may also include desaturated colors, including desaturated colors of a second hue.

The hue of selector 250 may generally match the hue of the underlying portion of settings map 240, as described above. However, the saturation of selector 250 may be adjusted according to the fan speed setting. In FIG. 5A, selector 250 may have a relatively low saturation to indicate the relatively low fan speed setting.

Figure 5B:
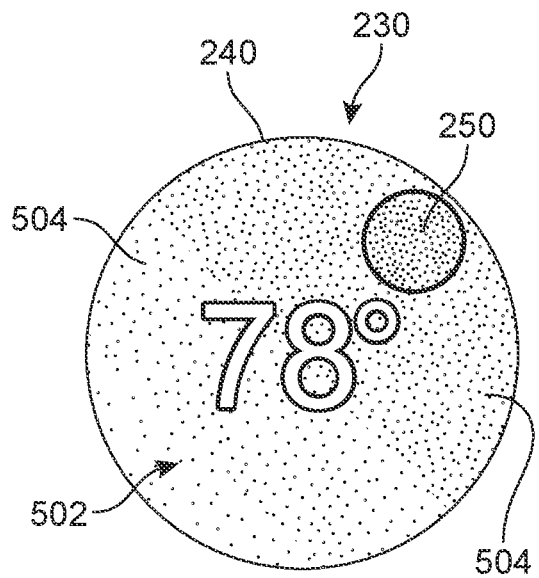

In FIG. 5B, the location of selector 250 corresponds to a relatively high temperature (78 degrees in this example) and a relatively high fan speed. These relative settings are reflected in the color attributes of both settings map 240 and selector 250. As in the configuration of FIG. 5A, settings map 240 is colored with gradient pattern 502 that is dominated by a first hue 504 which is associated with a higher temperature. By contrast with the view in FIG. 5A, in FIG. 5B, selector 250 may have a relatively high saturation to indicate the relatively high fan speed setting.

Figure 5C:
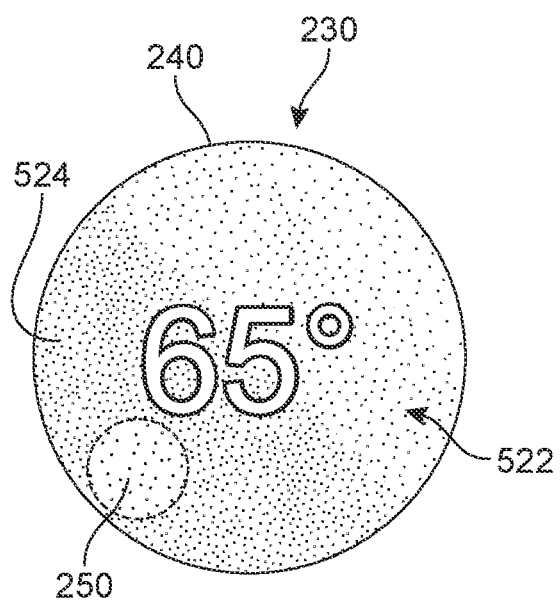

In FIG. 5C, the location of selector 250 corresponds to a relatively low temperature (65 degrees in this example) and a relatively low fan speed. These relative settings are reflected in the color attributes of both settings map 240 and selector 250. In this case, settings map 240 is colored with gradient pattern 522 that is dominated by a second hue 524 which is associated with a lower temperature. In one embodiment, the second hue 524 could be a cooler color, such as blue or purple. The gradient pattern may also include desaturated colors, including desaturated colors of first hue 504.

The hue of selector 250 may generally match the hue of the underlying portion of settings map 240, as described above. However, the saturation of selector 250 may be adjusted according to the fan speed setting. In the embodiment in FIG. 5C, selector 250 may have a relatively low saturation to indicate the relatively low fan speed setting.

Figure 5D:
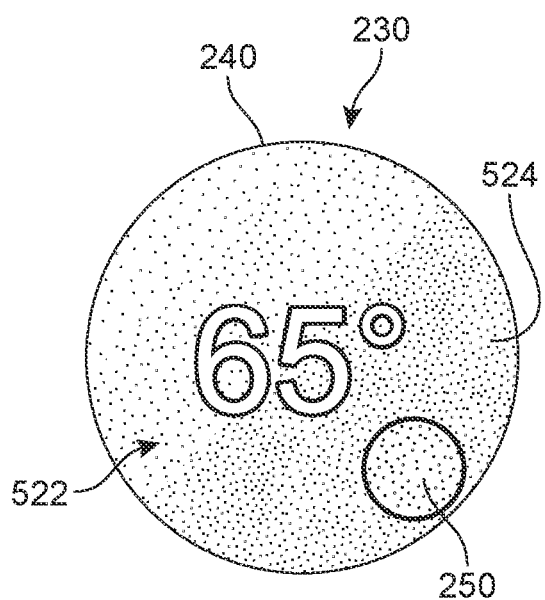

In FIG. 5D, the location of selector 250 corresponds to a relatively low temperature (65 degrees in this example) and a relatively high fan speed. These relative settings are reflected in the color attributes of both settings map 240 and selector 250. In this case, settings map 240 has a similar gradient pattern 524 to that shown in FIG. 5C, as the temperature is unchanged between FIGS. 5C and 5D. However, selector 250 may have a relatively high saturation to indicate the relatively high fan speed setting.

Taken together, FIGS. 5A-5D show how a user can quickly ascertain the relative climate control settings from the hue (or gradient pattern) of settings map 240 and the saturation of selector 250. Moreover, because both the hue (or gradient pattern) of settings map 240 and the saturation of selector 250 can take on nearly continuous values, the embodiments provide a way for a user to easily visualize a seemingly unlimited number of temperature and fan speed combinations.

It may be appreciated that in other embodiments, different color or other visual attributes of settings map 240 and/or selector 250 could be adjusted dynamically as the climate settings change. For example, in another embodiment, the fan speed setting could determine the hue or gradient pattern of settings map 240, and the saturation of selector 250 could be determined by the temperature. Moreover, any other suitable combination of color properties for settings map 240 and selector 250 that would allow a user to quickly infer the relative temperature and fan speed settings could also be adjusted.

Embodiments could also include non-visual feedback to indicate relative climate control settings to a user. In another embodiment, for example, haptic feedback could be used to indicate changes in relative temperature or changes in relative fan speed.

Figure 6C:
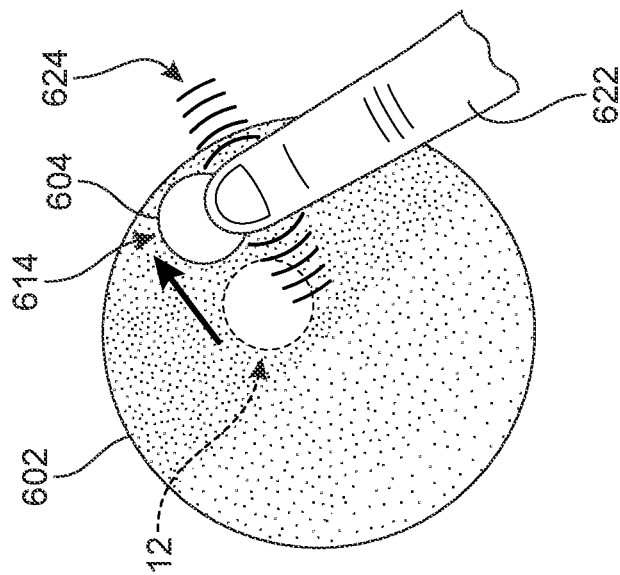
FIGS. 6A-6C are schematic views illustrating changes in haptic feedback in response to a user changing climate control settings, according to an embodiment.
Figure 6B:
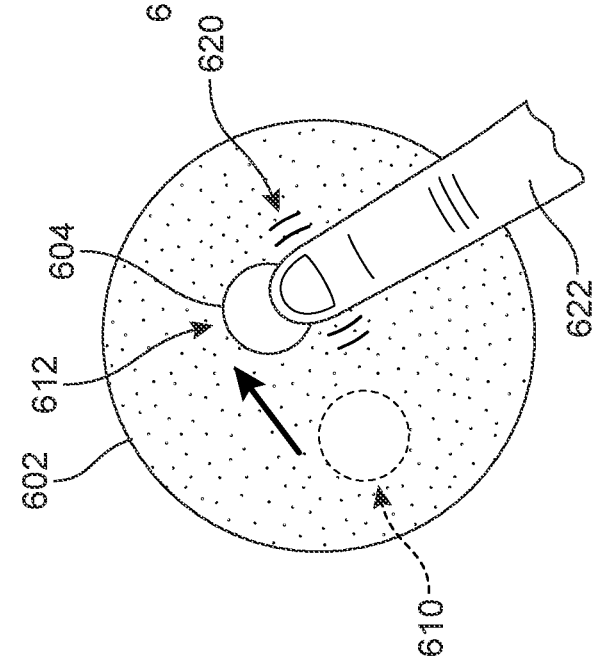
Figure 6A:
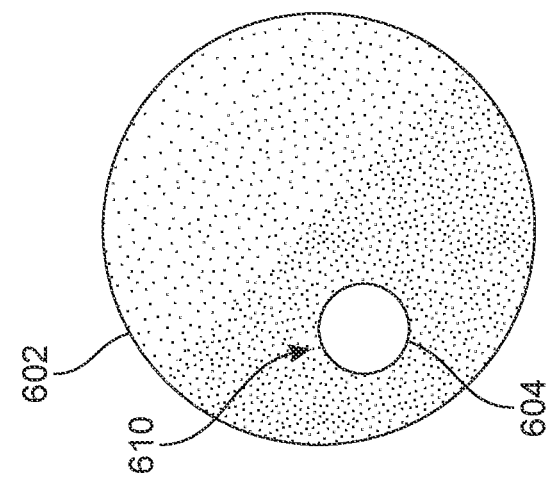

FIGS. 6A-6C show an embodiment where haptic feedback at a touch screen device is increased as a user drags a selector through a range of increasing fan speed settings. In FIG. 6A, a selector 604 is positioned at a first location 610 of climate settings map 602. In FIG. 6B, a user drags selector 604 to a second location 612 of climate settings map 602. Since second location 612 is located closer to the right side of climate settings map 602, second location 612 corresponds to a relatively higher fan speed than first location 610. Also, since second location 612 is located closer to the upper side of settings map 602, second location 612 corresponds to a relatively higher temperature than first location 610. In this case, the color of climate settings map 604 changes slightly as the temperature setting is slightly increased. In addition, the user experiences a first level of haptic feedback while touching selector 604 at second location 612. For purposes of illustration, this haptic feedback is indicated as vibrations 620 at finger 622.

Furthermore, as the user continues to drag selector 604 to third location 614, as shown in FIG. 6C, the user experiences a second level of haptic feedback (vibrations 624) that is greater than the first level of haptic feedback. This increase in haptic feedback is a result of the increased fan speed for third location 614 relative to second location 612. That is, the amount of haptic feedback provided to the user increases as the fan speed is increased.

It may be appreciated that the amount of haptic feedback provided at different fan speed settings could vary in different embodiments. For example, in one embodiment the amount of haptic feedback may increase in a linear manner as the fan speed is increased from its lowest speed to its highest speed. In another embodiment, the haptic feedback could be lowest at an intermediate fan speed and then may increase in magnitude as a selector is dragged away from the intermediate fan speed to either a lower fan speed or a higher fan speed.

Figure 7:
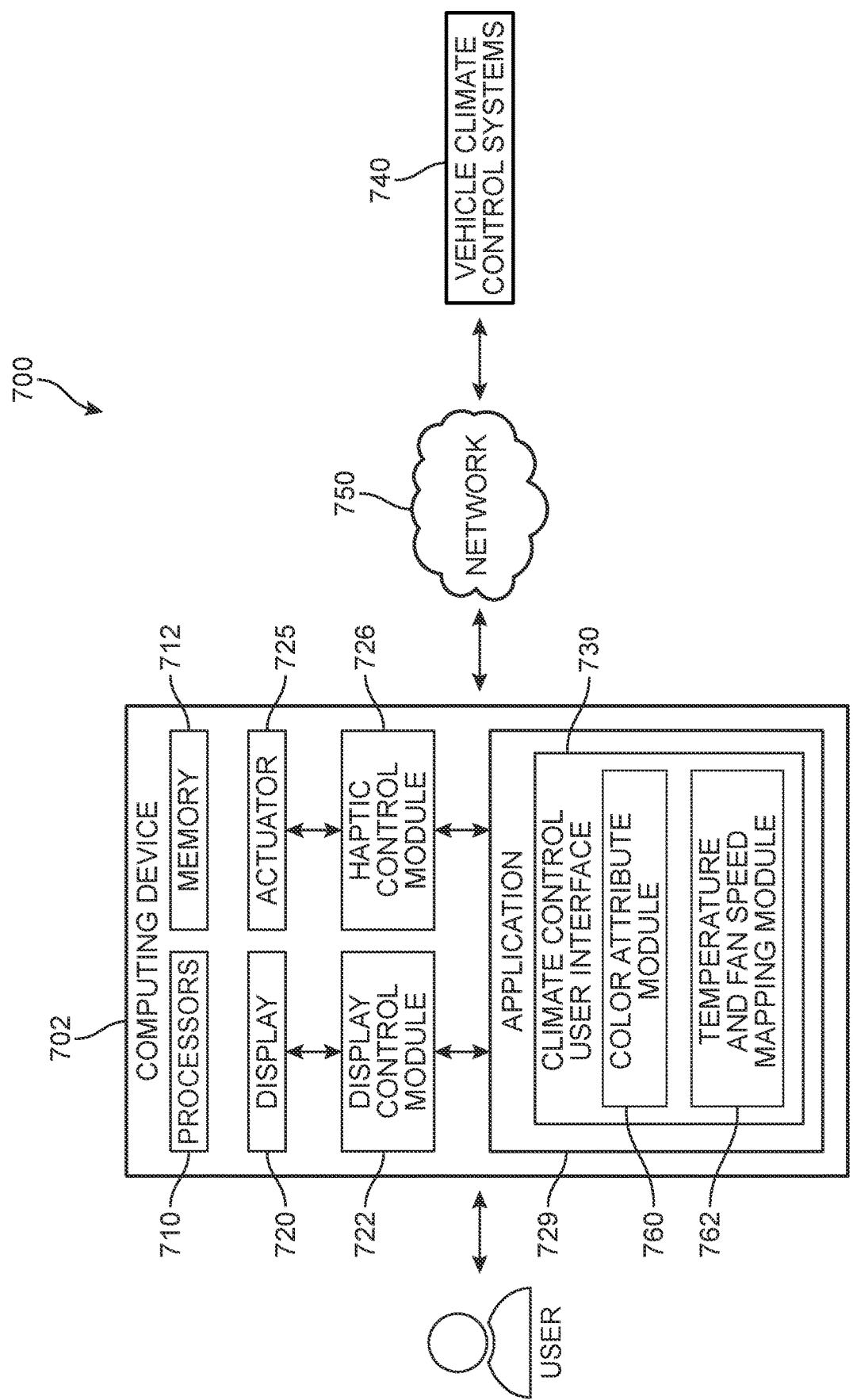
FIG. 7 is a schematic overview of a climate control application environment, according to an embodiment.

In order to provide the reader with a greater appreciation of the embodiments, FIG. 7 depicts a schematic overview of an embodiment of climate control application environment ("environment") 700. FIG. 7 is shown for the purposes of illustrating one or more exemplary embodiments and not for purposes of limiting the same. The components of the environment 700, including hardware architectures, and software architectures discussed herein, may be combined, omitted, or organized into different architectures for various embodiments.

In FIG. 7, the environment 700 includes a computing device 702. Computing device 702 could be a mobile phone, tablet computing device, onboard computing device, or any other suitable computing device. Computing device 702 may include processors 710 and memory 712. Memory 712 may comprise a non-transitory computer readable medium. Instructions stored within memory 712 may be executed by processors 710. Memory 712 stores a variety of data and applications.

Computing device 702 may also include a display 720. In some embodiments, display 720 could be a touchscreen display that can both display data and receive touch-based input from a user. Display 720 may be controlled or driven by a display control module 722.

In some embodiments, computing device 702 may also include an actuator 725, which may be used to generate haptic feedback by vibrating the device and/or display. Actuator 725 may be controlled or driven by a haptic control module 726.

Computing device 702 may run an application 729 that includes a climate control user interface ("interface") 730. In the exemplary embodiment, application 729 including interface 730 may be run natively on computing device 702. However, in other embodiments, application 729 including interface 730 may be hosted remotely, for example, using a cloud-based provider. In such cases, computing device 702 may act as a client that communicates with the remotely hosted application over any suitable network.

Interface 730 may be used to control climate settings for a vehicle, as described above. In the exemplary embodiment, interface 730 can send information to one or more vehicle climate control systems 740. It may be appreciated that vehicle climate control systems 740 may include both physical HVAC systems, as well as any climate control hardware or software used to intelligently control the HVAC systems. The information may be sent through wired and/or wireless connections. In one embodiment, information can be sent over a wireless network 750. Generally, network 750 may be any type of network, including, but not limited to Wi-Fi networks, cell phone networks, as well as any other type of network. Furthermore, network 750 may be associated with any type of network standard including, but not limited to CDMA, TDMA, GSM, AMPS, PCS, analog and/or W-CDMA. As a user provides input to interface 730 in the form of climate control settings, this information can be sent to vehicle climate control systems 740 so that the user selected temperature and fan speed settings can be implemented by these systems.

Interface 730 may further include a color attribute module 760. Color attribute module 760 may be used to control the color attributes (such as hue and saturation) of one or more graphical elements in response to user input.

Interface 730 may also include a temperature and fan speed mapping module 762. The temperature and fan speed mapping module 762 may be used to convert the locations on a climate settings map into a pair of temperature and fan speed settings.

Figure 8:
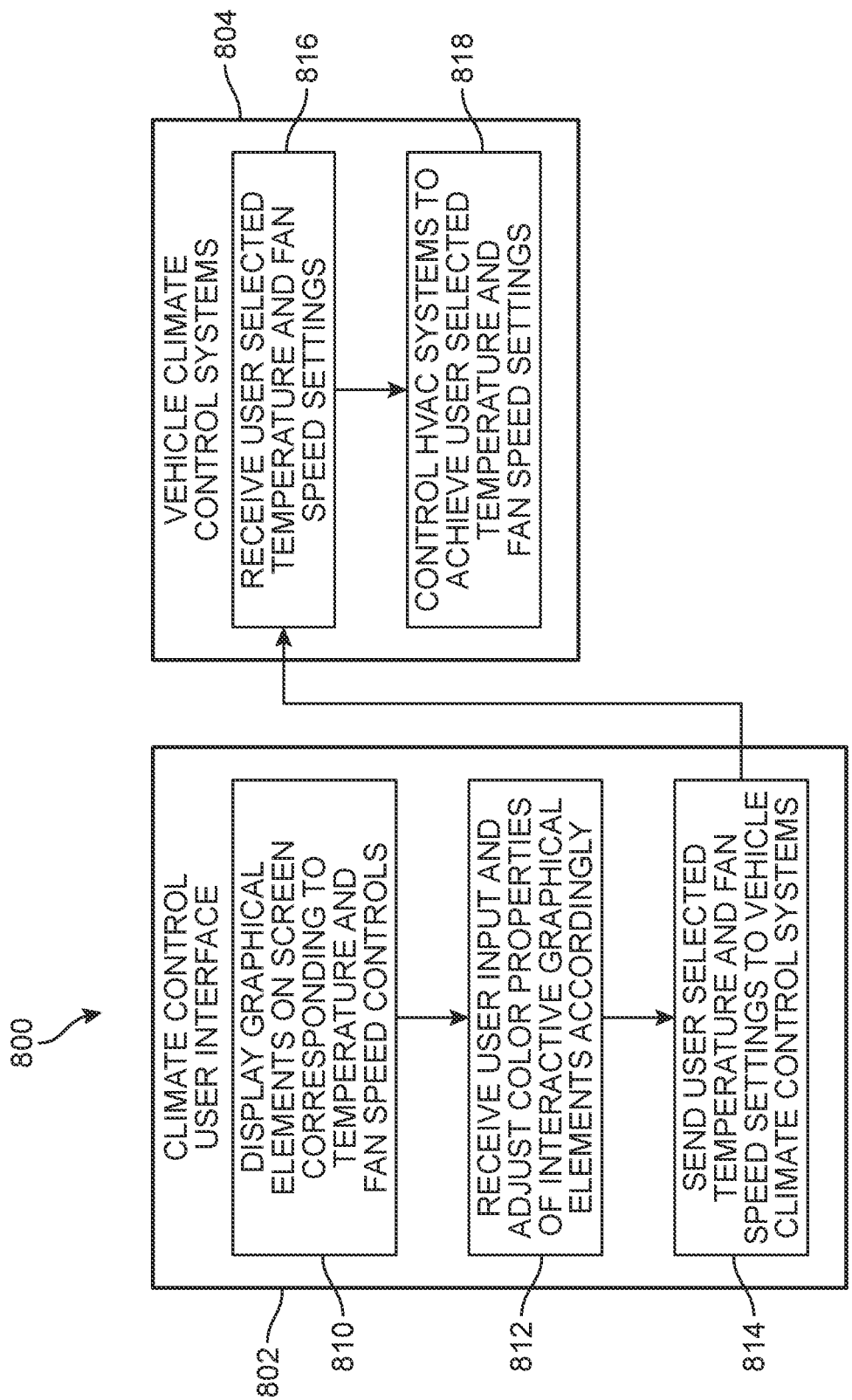
FIG. 8 is a flow diagram of a method for setting climate controls using a climate control user interface, according to an embodiment.

FIG. 8 is a schematic view of a method 800 of adjusting the climate settings in a vehicle and visualizing those changes for a user. As shown in FIG. 8, some of the following steps can be performed by a climate control user interface ("interface") 802 running on a computing device, such as a mobile phone, tablet, or other suitable computing device. Additionally, some steps could be performed by one or more vehicle climate control systems ("control systems") 804.

The method may begin with step 810, where the climate control user interface displays graphical elements on a screen. The graphical elements correspond to a settings map and a selector that can be used to adjust temperature and fan speed. Next, in step 812, user input may be received at interface 802. Based on this input, interface 802 may adjust the color properties of the displayed interactive elements. In step 814, which may occur before, after, or concurrently with step 812, interface 802 may send temperature and fan speed settings to vehicle systems 804.

In step 816, vehicle systems 804 receive the user selected temperature and fan speed settings. In step 818, vehicle systems 804 control the vehicle's HVAC systems to achieve the user selected temperature and fan speed settings.

Figure 9:
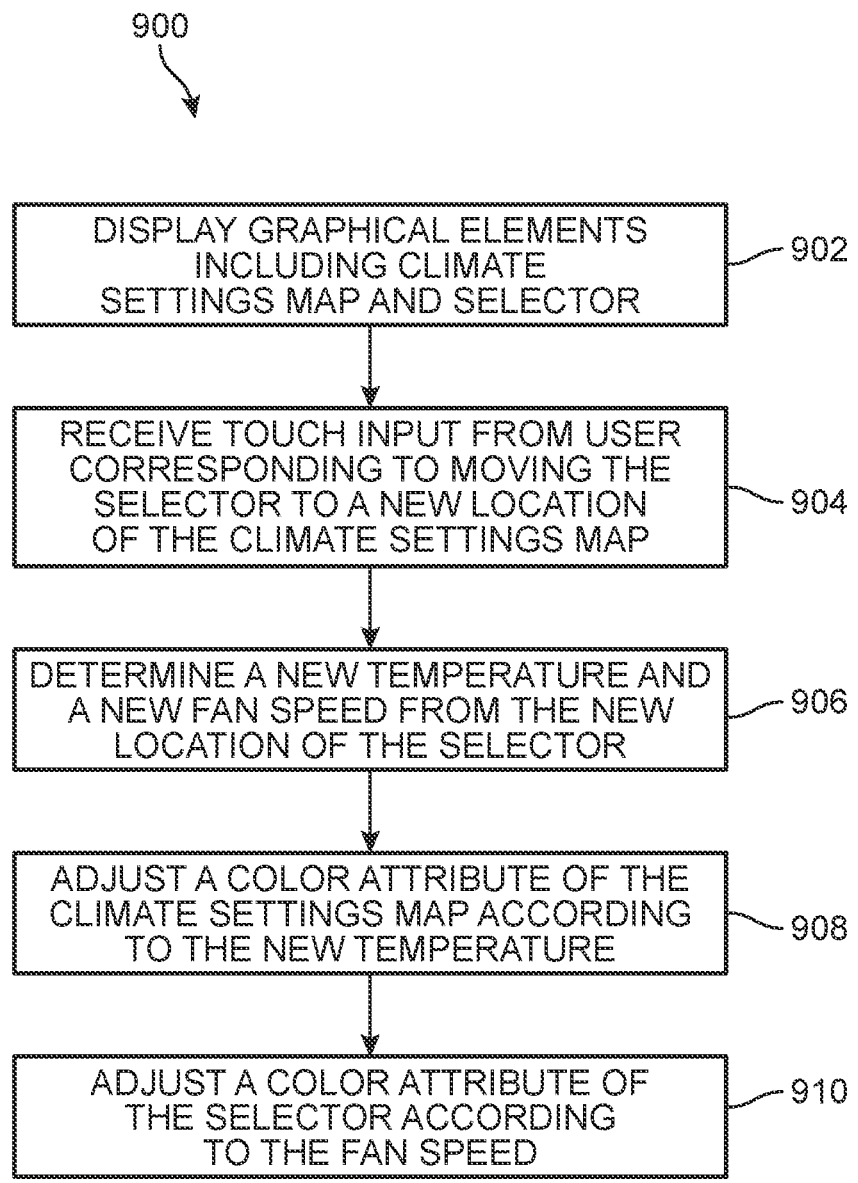
FIG. 9 is a flow diagram of a method for modifying the appearance of graphical elements in response to user input, according to an embodiment.

FIG. 9 is a schematic view of a method 900 for changing the color attributes of one or more graphical elements in response to changes in climate control settings. Starting in step 902, an interface could display graphical elements including a climate settings map and a selector. Next, in step 904, the interface could receive touch input from a user corresponding to changing the location of the selector on the climate settings map. In step 906, the interface could determine a new temperature and a new fan speed from the new location of the selector. In some cases, this step could be performed using a temperature and fan speed mapping module (for example, module 762 in FIG. 7). In step 908, the interface could adjust a color attribute of the climate settings map according to the new temperature. In one embodiment, the interface could adjust a hue of the climate settings map. In another embodiment, the interface could adjust a gradient pattern of the climate settings map. In step 910, the interface could adjust a color attribute of the selector according to the new fan speed. In one embodiment, the interface could adjust the saturation of the selector according to the new fan speed.

Figure 10:
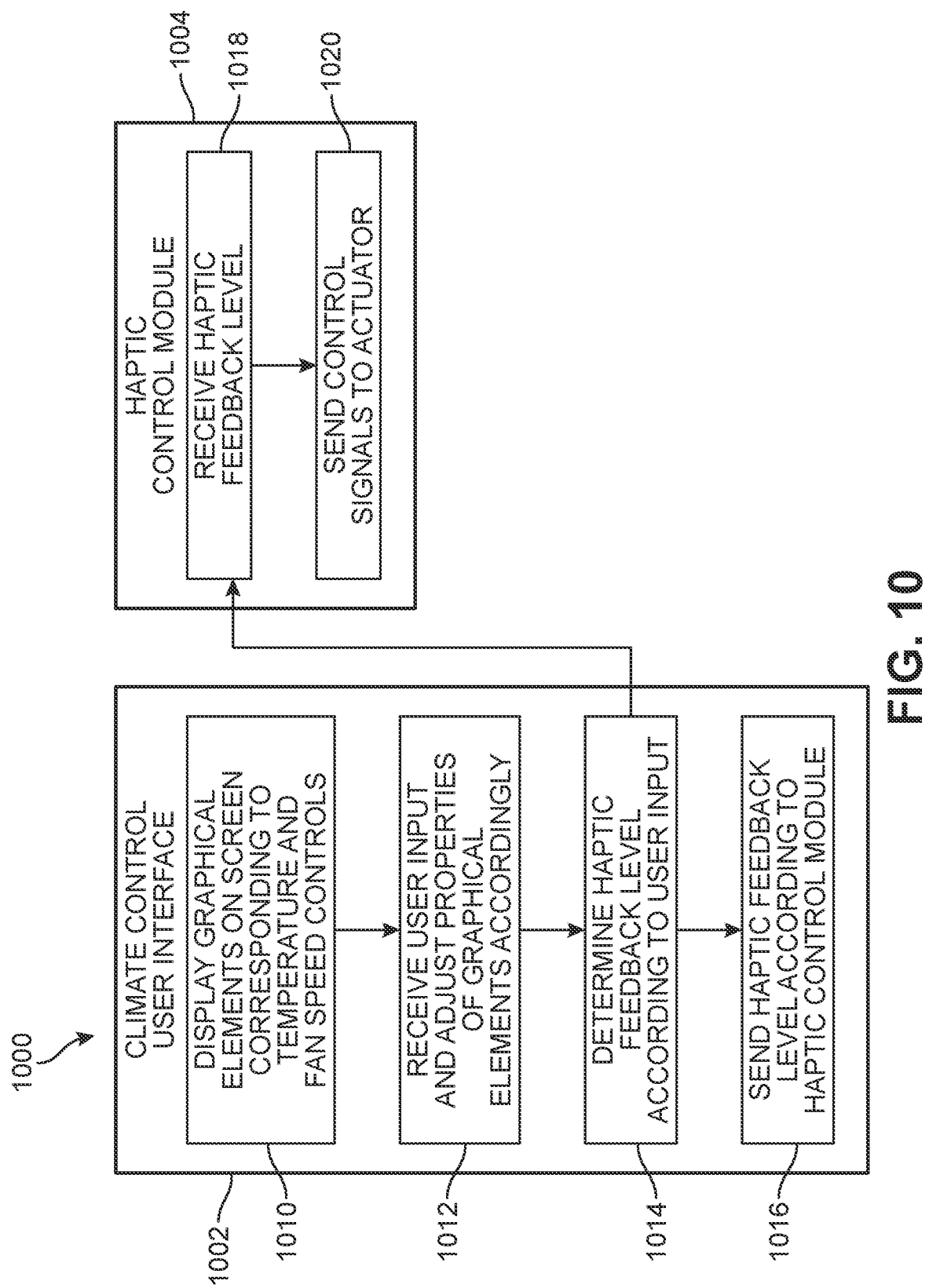
FIG. 10 is a flow diagram of a method for increasing haptic feedback from a display in response to user input, according to an embodiment.

FIG. 10 is a schematic view of a method 1000 for changing the amount of haptic feedback provided to a user in response to changes in climate control settings. As shown in FIG. 10, some of the following steps can be performed by a climate control user interface ("interface") 1002 running on a computing device, such as a mobile phone, tablet, or other suitable computing device. Additionally, some steps could be performed by a haptic control module ("haptic module") 1004.

The method may begin with step 1010, where the climate control user interface displays graphical elements on a screen. The graphical elements correspond to temperature and fan speed controls that can be adjusted by the user. Next, in step 1012, user input may be received at interface 1002. Based on this input, interface 1002 may adjust the color properties of the displayed graphical elements accordingly. In one embodiment, in step 1012, interface 1002 could change the color of a climate settings map. In step 1014, interface 1002 may determine a haptic feedback level according to the selected user input. For example, if the user selects a relatively high fan speed, this may correspond to a relatively high haptic feedback level. In step 1016, interface 1002 may send the haptic feedback level to the haptic control module.

In step 1018, haptic module 1004 receives the haptic feedback level. Then, in step 1020, haptic module 1004 sends the appropriate control signals to an actuator in the device where the haptic control module is located. The actuator can then generate the desired amount of vibration to be felt by the user as they drag their finger along the display.

The following includes definitions of selected terms employed herein. The definitions include various examples and/or forms of components that fall within the scope of a term and that can be used for implementation. The examples are not intended to be limiting. Aspects of the present disclosure can be implemented using hardware, software, or a combination thereof and can be implemented in one or more computer systems or other processing systems. In one example variation, aspects described herein can be directed toward one or more computer systems capable of carrying out the functionality described herein. An example of such a computer system includes one or more processors. A "processor", as used herein, generally processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

The apparatus and methods described herein and illustrated in the accompanying drawings by various blocks, modules, components, circuits, steps, processes, algorithms, etc. (collectively referred to as "elements") can be implemented using electronic hardware, computer software, or any combination thereof. Whether such elements are implemented as hardware or software depends upon the particular application and design constraints imposed on the overall system. By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The processor can be connected to a communication infrastructure (e.g., a communications bus, cross-over bar, or network). Various software aspects are described in terms of this example computer system. After reading this description, it will become apparent to a person skilled in the relevant art(s) how to implement aspects described herein using other computer systems and/or architectures.

Computer system can include a display interface that forwards graphics, text, and other data from the communication infrastructure (or from a frame buffer) for display on a display unit. Display unit can include display, in one example. Computer system also includes a main memory, e.g., random access memory (RAM), and can also include a secondary memory. The secondary memory can include, e.g., a hard disk drive and/or a removable storage drive, representing a floppy disk drive, a magnetic tape drive, an optical disk drive, etc. The removable storage drive reads from and/or writes to a removable storage unit in a well-known manner. Removable storage unit, represents a floppy disk, magnetic tape, optical disk, etc., which is read by and written to removable storage drive. As will be appreciated, the removable storage unit includes a computer usable storage medium having stored therein computer software and/or data.

Computer system can also include a communications interface. Communications interface allows software and data to be transferred between computer system and external devices. Examples of communications interface can include a modem, a network interface (such as an Ethernet card), a communications port, a Personal Computer Memory Card International Association (PCMCIA) slot and card, etc. Software and data transferred via communications interface are in the form of signals, which can be electronic, electromagnetic, optical or other signals capable of being received by communications interface. These signals are provided to communications interface via a communications path (e.g., channel). This path carries signals and can be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals. These computer program products provide software to the computer system. Aspects described herein can be directed to such computer program products. Communications device can include communications interface.

Computer programs (also referred to as computer control logic) are stored in main memory and/or secondary memory. Computer programs can also be received via communications interface. Such computer programs, when executed, enable the computer system to perform various features in accordance with aspects described herein. In particular, the computer programs, when executed, enable the processor to perform such features. Accordingly, such computer programs represent controllers of the computer system.

In variations where aspects described herein are implemented using software, the software can be stored in a computer program product and loaded into computer system using removable storage drive, hard disk drive, or communications interface. The control logic (software), when executed by the processor, causes the processor to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s). In yet another example variation, aspects described herein are implemented using a combination of both hardware and software.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. A method of modifying an appearance of graphical elements of a climate control application in response to user behavior, the method comprising:
displaying a first graphical element comprising a climate settings map, wherein different locations on the climate settings map correspond to different pairs of temperature and fan speed settings for a climate control system;
displaying a second graphical element comprising a climate setting selector in front of the first graphical element so that the second graphical element is superimposed over the first graphical element, wherein moving the climate setting selector to different locations of the climate settings map corresponds to adjusting the temperature and fan speed settings of the climate control system;
receiving, via the climate control application, user input corresponding to moving the climate setting selector from a first location of the climate settings map to a second location of the climate settings map, wherein the first location corresponds to a first temperature setting and a first fan speed setting and wherein the second location corresponds to a second temperature setting and a second fan speed setting;
changing a hue of the climate settings map as the climate setting selector is moved from the first location to the second location;
changing a hue of the climate setting selector as the climate setting selector is moved from the first location to the second location; and
changing a saturation of the climate setting selector as the climate setting selector is moved from the first location to the second location.

2. The method according to claim 1, wherein the climate settings map and the climate setting selector have identical shapes.

3. The method according to claim 2, wherein the climate settings map and the climate setting selector are both circular in shape.

4. The method according to claim 1, wherein changing the saturation of the climate setting selector includes changing the saturation from a first saturation value associated with the first fan speed setting to a second saturation value associated with the second fan speed setting.

5. The method according to claim 1, wherein changing the hue of the climate settings map includes changing the hue from a first hue value associated with the first temperature setting to a second hue value associated with the second temperature setting.

6. The method according to claim 1, wherein changing the hue of the climate setting selector includes changing the hue from a first hue value associated with the first temperature setting to a second hue value associated with the second temperature setting.

7. The method according to claim 1, wherein the hue of the climate setting selector and the hue of the climate settings map are identical.

8. The method according to claim 1, wherein the first graphical element has an outer boundary and wherein the second graphical element is constrained to move within the outer boundary of the first graphical element.

9. A method of modifying visual and haptic feedback at a display in response to user input received at a climate control application, the method comprising:
- displaying a first graphical element comprising a climate settings map, wherein different locations on the climate settings map correspond to different pairs of temperature and fan speed settings for a climate control system;
- displaying a second graphical element comprising a climate setting selector in front of the first graphical element so that the second graphical element is superimposed over the first graphical element, wherein moving the climate setting selector to different locations of the climate settings map corresponds to adjusting the temperature and fan speed settings of the climate control system, and wherein the climate settings map includes an intermediate location corresponding to an intermediate fan speed setting;
- receiving, via the climate control application, user input corresponding to moving the climate setting selector from a first location of the climate settings map to a second location of the climate settings map;
- changing a hue of the climate settings map from a first hue at the first location to a second hue at the second location;
- changing a magnitude of haptic feedback provided at the display from a first magnitude at the first location to a second magnitude at the second location such that the magnitude of haptic feedback increases as the climate setting selector is dragged away from the intermediate location and such that the magnitude of haptic feedback decreases as the climate setting selector is dragged towards the intermediate location.

10. The method according to claim 9, wherein the climate settings map includes a minimum fan speed setting at a fourth location and a maximum fan speed at a fifth location and wherein the intermediate location is disposed between the fourth location and the fifth location.

11. The method according to claim 9, wherein changing the fan speed settings of the climate settings map is associated with moving the climate setting selector in a horizontal direction.

12. The method according to claim 9, wherein the hue of the climate settings map changes as the temperature settings change.

13. The method according to claim 9, wherein the climate settings map has a circular shape including an outer boundary;
- wherein the climate setting selector has a circular shape; and
- wherein the climate setting selector is constrained to move within the outer boundary of the climate setting selector.

14. A system for adjusting an appearance of graphical elements of a climate control application in response to user behavior, the system comprising a processor and machine-readable media including instructions which, when executed by the processor, cause the processor to:
- display a first graphical element comprising a climate settings map, wherein different locations on the climate settings map correspond to a different pair of temperature and fan speed settings for a climate control system;
- display a second graphical element comprising a climate setting selector in front of the first graphical element so that the second graphical element is superimposed over the first graphical element, wherein moving the climate setting selector to different locations of the climate settings map corresponds to adjusting the temperature and fan speed settings of the climate control system;
- receive, via the climate control application, user input corresponding to moving the climate setting selector from a first location of the climate settings map to a second location of the climate settings map, wherein the first location corresponds to a first temperature setting and a first fan speed setting and wherein the second location corresponds to a second temperature setting and a second fan speed setting;
- change a hue of the climate settings map as the climate setting selector is moved from the first location to the second location;
- change a hue of the climate setting selector as the climate setting selector is moved from the first location to the second location; and
- change a saturation of the climate setting selector as the climate setting selector is moved from the first location to the second location.

15. The system according to claim 14, wherein the first graphical element has a circular shape and wherein the second graphical element has a circular shape.

16. The system according to claim 14, wherein the instructions further cause the processor to determine a selected temperature and a selected fan speed from the second location of the climate settings map.

17. The system according to claim 16, wherein the first fan speed setting is lower than the second fan speed setting and wherein the instructions further cause the processor to increase the saturation of the climate setting selector as the climate setting selector moves from the first location to the second location.

18. The system according to claim 14, wherein the hue of the climate settings map and the hue of the climate setting selector change according to the first temperature setting and the second temperature setting.

19. The system according to claim 14, wherein the first fan speed setting is higher than the second fan speed setting and wherein the instructions further cause the processor to decrease the saturation of the climate setting selector as the climate setting selector moves from the first location to the second location.

20. The system according to claim 14, wherein the instructions further cause the processor to change a gradient pattern of the climate settings map in response to changes in the location of the climate setting selector.

* * * * *